United States Patent [19]
Yukitomo et al.

[11] Patent Number: 6,147,645
[45] Date of Patent: Nov. 14, 2000

[54] ADAPTIVE RECEPTION DIVERSITY APPARATUS AND ADAPTIVE TRANSMISSION DIVERSITY APPARATUS

[75] Inventors: Hideki Yukitomo, Yokohama; Katsuhiko Hiramatsu, Yokosuka, both of Japan

[73] Assignee: Matsushita Electric Industrial Co., Ltd., Osaka, Japan

[21] Appl. No.: 09/053,063

[22] Filed: Apr. 1, 1998

[30] Foreign Application Priority Data

Apr. 2, 1997 [JP] Japan .................................. 9-099639

[51] Int. Cl.[7] .............................. H01Q 3/26; H04B 7/00; G01S 3/16; G01S 3/28
[52] U.S. Cl. ........................... 342/372; 342/367; 342/382
[58] Field of Search .................................. 342/368, 369, 342/367, 370, 375, 372, 359, 380, 381, 382, 383, 384, 371

[56] References Cited

U.S. PATENT DOCUMENTS

| | | |
|---|---|---|
| 3,680,112 | 7/1972 | Thomas ..................................... 342/70 |
| 5,151,706 | 9/1992 | Roederer et al. ....................... 342/372 |
| 5,157,407 | 10/1992 | Omiya ..................................... 342/359 |
| 5,585,803 | 12/1996 | Miura et al. ............................. 342/372 |
| 5,861,840 | 1/1999 | Tarran et al. ............................. 342/371 |
| 5,917,447 | 6/1999 | Wang et al. ............................. 342/368 |

FOREIGN PATENT DOCUMENTS

| | | |
|---|---|---|
| 6-196921 | 7/1994 | Japan . |
| 8-316772 | 11/1996 | Japan . |
| 97/00543 | 1/1997 | WIPO . |

OTHER PUBLICATIONS

An English Language Abstract of JP 6–196921.
An English Language Abstract of JP 8–316772.
An article by H. Andersson et al., entitled: "An Adaptive Antenna For the NMT 900 Mobile Telephony System", at pp. 610–614 of *Proceedings of the Vehicular Technology Conference, Institute of Electrical and Electronics Engineers*, Stockholm Jun. 8–10, 1994, vol. 1, No. CONF. 44, Jun. 8, 1994.

An article by N. Kuroiwa et al., entitled "Design of a Directional Diversity Receiver Using an Adaptive Array Antenna," published in *Electronics & Communications In Japan, Part I–Communications*, vol. 74, No. 7, Jul. 1, 1991, pp. 87–97 (XP000270241).

An article by M. Mizuno et al., entitled "Application of Adaptive Array Antennas to radio Communications," published in *Electronics & Communications In Japan, Part I–Communications*, vol. 77, No. 2, Feb. 1994, pp. 48–58 (XP000468597).

*Primary Examiner*—Thomas H. Tarcza
*Assistant Examiner*—Fred H. Mull
*Attorney, Agent, or Firm*—Greenblum & Bernstein, P.L.C.

[57] ABSTRACT

By estimating the movement direction of a communication partner, the radiation pattern is forcibly rotated to thereby form a correct radiation pattern. Specifically, an apparatus of the present invention includes reception radiation pattern control section for providing a reception signal from an antenna with a first reception radiation pattern by a first control signal, radiation pattern control section for providing the abovementioned reception signal with a second reception radiation pattern by a second control signal based on an output of movement direction estimating section for estimating a movement direction of a transmitting side, and a reception signal processing system having multiplication section for multiplying the abovementioned reception signal by the first control signal and the second control signal. Consequently, even when the movement speed of the transmitting side or the receiving side is high, by causing a reception radiation pattern controller or a transmission radiation pattern controller to respond to the movement to thereby form a correct radiation pattern, the transmission and reception performance can be improved.

14 Claims, 3 Drawing Sheets

ADAPTIVE RECEPTION DIVERSITY APPARATUS AND ADAPTIVE TRANSMISSION DIVERSITY APPARATUS

BACKGROUND OF THE INVENTION

1. Field of the Invention

The present invention relates to an adaptive diversity apparatus for digital communication.

2. Description of the Related Art

A conventional adaptive diversity apparatus will be described with reference to FIG. 1 and FIG. 2. FIG. 1 is a block diagram of the conventional adaptive diversity apparatus. FIG. 2 is a radiation pattern view of assistance in explaining reception (transmission) radiation pattern. In FIG. 1, complex signals which are received by reception antennas 1, 2, 3 and 4 at a time t, A/D converted and quasi-coherent detected complex signals are designated $S_1(t)$, $S_2(t)$, $S_3(t)$ and $S_4(t)$, respectively.

A reception radiation pattern controller 9 transmits complex weights $W_1(t)$, $W_2(t)$, $W_3(t)$ and $W_4(t)$ to multipliers 5, 6, 7 and 8. The multipliers 5, 6, 7 and 8 multiply the abovementioned complex signals by the complex weights. The multiplied complex signals are added by an adder 12. At this time, when the output of the reception radiation pattern controller 9 is S(t), the output S(t) can be expressed as the following formula (1):

$$S(t) = \Sigma_1^4 W_i(t) S_i(t) \quad (1)$$

By thus composing the reception signals from a plurality of antennas after multiplying them by appropriate complex numbers, it is possible to provide all the antennas with radiation pattern on a plane as shown in FIG. 2. For example, in FIG. 2, when a desired signal is coming from the direction of the arrow 21 and an interference signal is coming from the direction of the arrow 22, the reception radiation pattern controller 9 controls the radiation pattern as shown at the reference numeral 23 of FIG. 2. That is, the controller 9 controls the radiation pattern so that the desired signal is received with high intensity and the interference signal is received with low intensity. Thereby, the reception performance can be improved.

A decider 11 outputs the result D(t) of hard decision of the composite signal S(t). An error detector 10 outputs the difference D(t)−S(t) between the composite signal S(t) and the detected result D(t). The reception radiation pattern controller 9 updates its output complex weights $W_1(t)$, $W_2(t)$, $W_3(t)$ and $W_4(t)$ based on the output of the error detector and $S_1(t)$, $S_2(t)$, $S_3(t)$ and $S_4(1)$.

For example, when the reception signal vector is expressed as $Sig(t)=(S_1(t), S_2(t), S_3(t), S_4(t))^T$ and the output of the reception radiation pattern controller, as $W(t)=(W_1(t), W_2(t), W_3(t), W_4(t))^T$, the updated complex weights can be expressed as the following formula (2):

$$W(t+1) = W(t) + \mu(D(t)-S(t))^T Sig(t) \quad (2)$$

Here, $\mu$ is a step factor.

In the above-described conventional adaptive diversity apparatus, by successively updating the weights which are multiplied by the input signals from the antennas, even when the transmitting side moves, the radiation pattern can be formed in accordance with the movement.

In the conventional apparatus, when the movement speed of the transmitting side is low, the radiation pattern can be formed in accordance with the movement; however, when the movement speed of the transmitting side is high, since the complex weights do not converge, the processing by the reception radiation pattern controller cannot respond to the movement, so that a correct radiation pattern cannot be formed.

SUMMARY OF THE INVENTION

An object of the present invention is to provide an adaptive diversity apparatus in which the transmission and reception performance is improved by causing a reception radiation pattern controller or a transmission radiation pattern controller to respond to the movement of a transmitting side or a receiving side to thereby form a correct radiation pattern even when the movement speed of the transmitting side or the receiving side is high.

To solve the abovementioned problem, according to the present invention, by estimating the movement direction of a communication partner, the radiation pattern is forcibly rotated to thereby form a correct radiation pattern.

Specifically, an adaptive diversity apparatus of the present invention comprises: reception radiation pattern control means for providing a reception signal from an antenna with a first reception radiation pattern by a first control signal; radiation pattern control means for providing the reception signal with a second reception radiation pattern by a second control signal based on an output of movement direction estimating means for estimating a movement direction of a transmitting side; and a reception signal processing system having multiplication means for multiplying the abovementioned reception signal by the abovementioned first control signal and the second control signal.

According to this feature, since the reception radiation pattern extracted and generated from the reception signal can be corrected at high speed in accordance with the movement of the transmitting side, the reception performance can be significantly improved.

Moreover, in the adaptive diversity apparatus of the present invention, the radiation pattern control means outputs the second control signal for controlling rotation of the first reception radiation pattern based on the output of the movement direction estimating means. According to this feature, by rotating the phase of the first reception radiation pattern, the reception radiation pattern can be surely and easily corrected.

Moreover, in the adaptive diversity apparatus of the present invention, the radiation pattern control means generates the second control signal so as to cancel a phase variation obtained by displacement of a direction of arrival. According to this feature, since a relative angle from a communication partner can be calculated by estimating from the reception signal the direction of arrival, radiation pattern control can be realized at a low cost.

Moreover, in the adaptive diversity apparatus of the present invention, the reception radiation pattern control means and the radiation pattern control means are provided independently of each other, and the reception signal, the first control signal and the second control signal are multiplied by single multiplication means. Thereby, the circuit is simplified, so that incorporation or mounting of the radiation pattern control means into an existing circuit is facilitated.

Moreover, in a case where the present invention is applied to an adaptive reception diversity apparatus, specifically, an arrangement is employed comprising: a plurality of antennas; movement direction estimating means for estimating a movement direction of a transmitting side; reception radiation pattern control means for providing reception signals from the antennas with reception radiation pattern; addition means for composing a plurality of inputs from the abovementioned antennas; radiation pattern control means for controlling rotation of the abovementioned reception radiation pattern based on an output of the abovementioned movement direction estimating means; decision means for performing hard decision of an output of the abovementioned addition means; and error detecting means for detecting an error between an output of the decision means and the output of the abovementioned addition means, to feed back the error to the abovementioned reception radiation pattern control means.

Moreover, in the adaptive diversity apparatus of the present invention, the radiation pattern correction control means obtains a relative phase variation due to a movement of the transmitting side at each of the plurality of disposed antennas based on the output of the movement direction estimating means, and generates the second control signal in accordance with each phase variation. Moreover, in the adaptive diversity apparatus of the present invention, the radiation pattern control means obtains a relative phase variation due to a movement of the receiving side at each of the plurality of disposed antennas based on the output of the movement direction estimating means, and generates the second control signal in accordance with each phase variation. According to these features, the conformity of the reception radiation pattern significantly improves, so that the overall reception accuracy of the apparatus improves. In view of improvement in accuracy, the provision of a greater number of antennas results in higher accuracy.

Moreover, in the adaptive diversity apparatus of the present invention, the following are provided: transmission radiation pattern control means for providing a transmission signal from an antenna with a first transmission radiation pattern by a first control signal; radiation pattern control means for providing the abovementioned transmission signal with a second transmission radiation pattern by a second control signal based on an output of movement direction estimating means for estimating a movement direction of a receiving side; and a transmission signal processing system having multiplication means for multiplying the abovementioned transmission signal by the first control signal and the second control signal. According to this feature, since the transmission radiation pattern composed into the transmission signal can be corrected at high speed in accordance with the movement of the receiving side, the transmission performance can be significantly improved.

Moreover, in the adaptive diversity apparatus of the present invention, the radiation pattern control means outputs the second control signal for controlling rotation of the first transmission radiation pattern based on the output of the movement direction estimating means. According to this feature, by rotating the phase of the first transmission radiation pattern, the transmission radiation pattern can be surely and easily corrected.

Moreover, in the adaptive diversity apparatus of the present invention, the radiation pattern control means generates the second control signal so as to cancel a phase variation obtained by displacement of a direction of arrival of a reception wave. According to this feature, since a relative angle from a communication partner can be calculated by estimating from the reception signal the direction of arrival of a reception wave, radiation pattern correction can be realized at a low cost.

Moreover, in the adaptive diversity apparatus of the present invention, the transmission radiation pattern control means and the radiation pattern control means are provided independently of each other, and the transmission signal, the first control signal and the second control signal are multiplied by single multiplication means. Thereby, the circuit is simplified, so that incorporation or mounting of the radiation pattern means into an existing circuit is facilitated.

Moreover, the adaptive diversity apparatus of the present invention can be applied to each of a reception portion and a transmission portion to form an adaptive diversity transmission and reception apparatus. Thereby, when a user uses, while moving, a portable radio communication apparatus time-divisional and alternately having a transmission slot and a reception slot, the transmission and reception accuracy improves.

DETAILED DESCRIPTION OF THE PREFERRED EMBODIMENTS

Hereinafter, preferred embodiments of the present invention will be described with reference to FIG. 3 to FIG. 6.

First Embodiment

Figure 1:
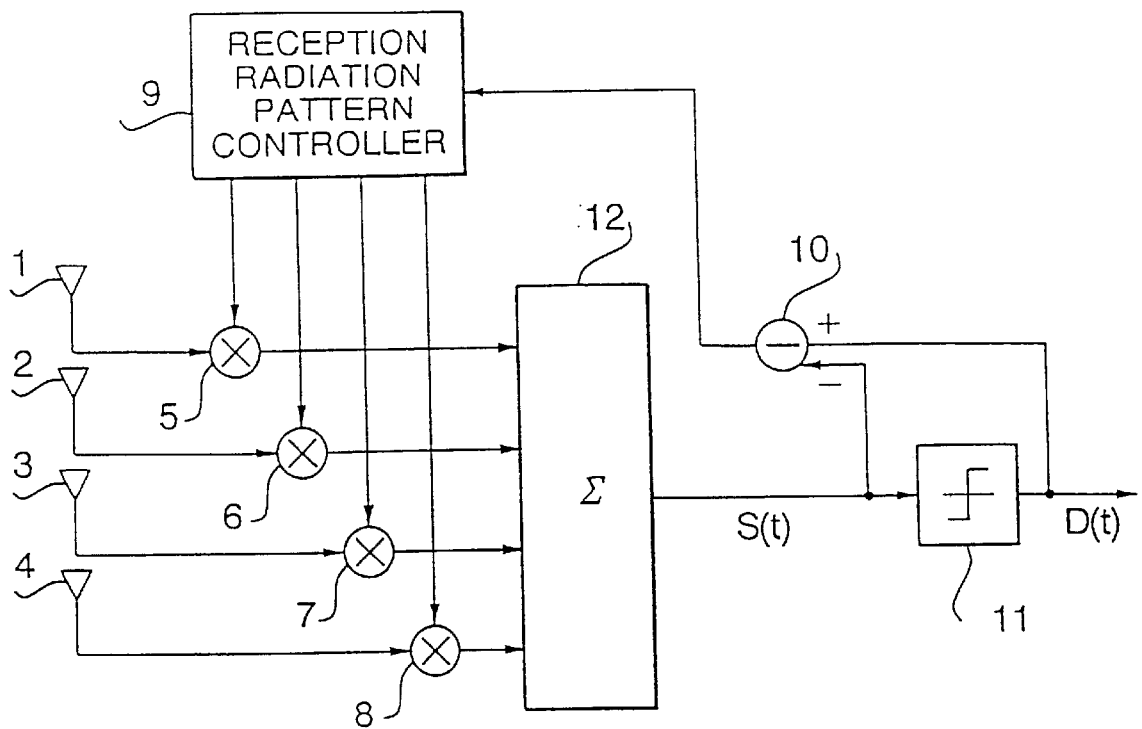
FIG. 1 is a block diagram of a conventional reception diversity apparatus.
Figure 2:
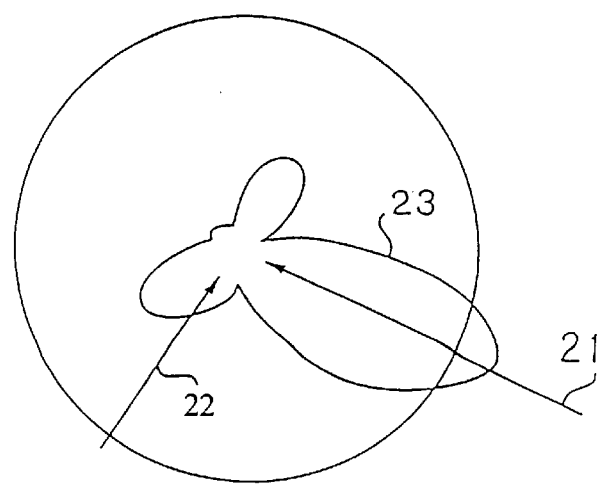
FIG. 2 is a view of a reception (transmission) radiation pattern.
Figure 3:
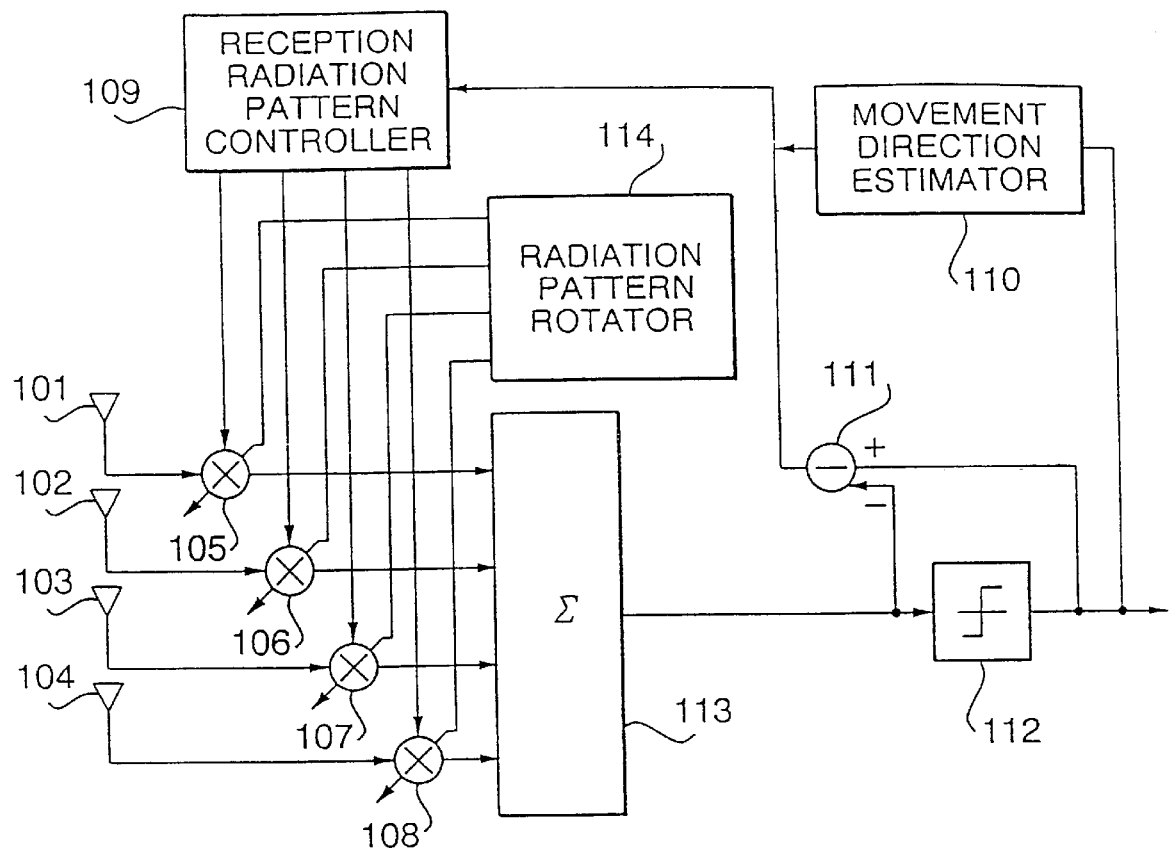
FIG. 3 is a block diagram of an adaptive reception diversity apparatus according to a first embodiment of the present invention.
Figure 4:
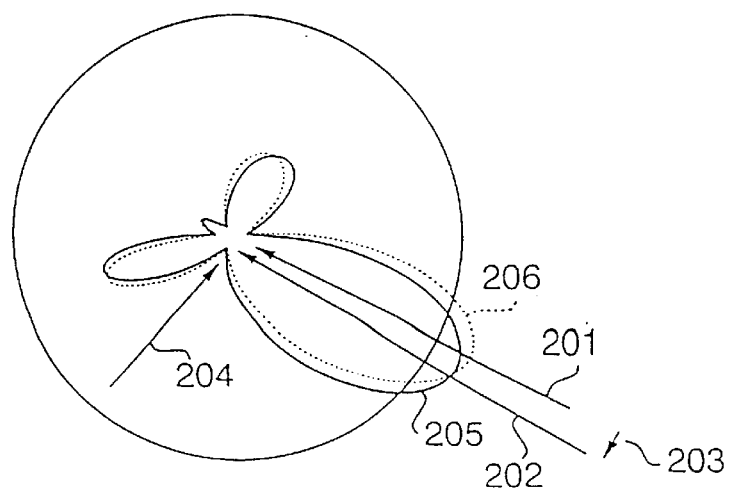
FIG. 4 is a view of a reception (transmission) radiation pattern in the present invention.
Figure 5:
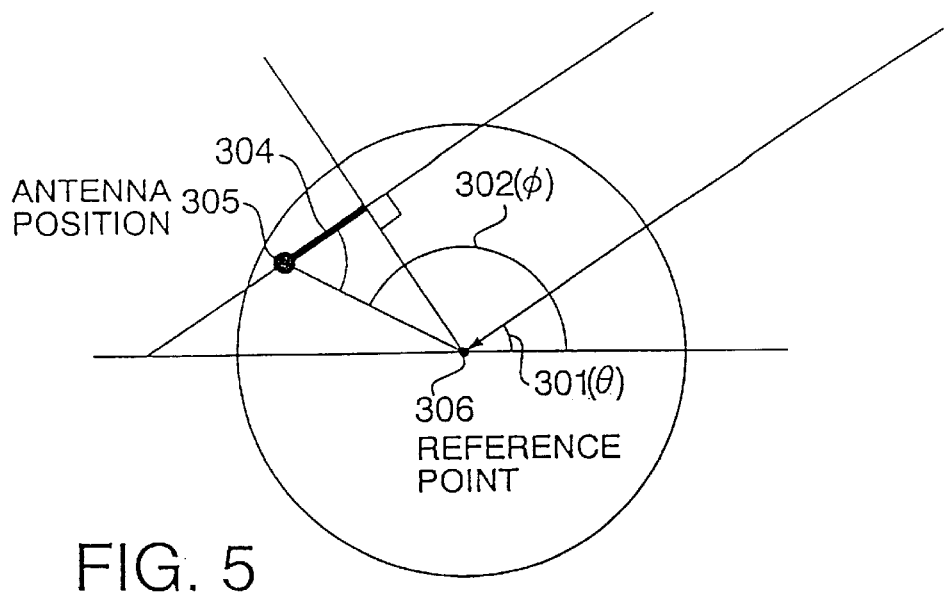
FIG. 5 is an explanatory view of reception (transmission) phase rotation in the present invention.

FIG. 3 is a block diagram showing an adaptive reception diversity apparatus according to a first embodiment of the present invention. FIG. 4 is a view showing a reception (transmission) radiation pattern in the present invention. FIG. 5 is an explanatory view of reception (transmission) phase rotation in the present invention.

The adaptive reception diversity apparatus includes a plurality of antennas 101, 102, 103 and 104; a reception radiation pattern controller 109 for controlling inputs from the respective antennas so that they can be composed so as to have radiation pattern; multipliers 105, 106, 107 and 108 for multiplying the output from the reception radiation pattern controller and the inputs from the respective antennas; an adder 113 for composing the outputs of the multipliers; a decider 112 for performing hard decision of the output of the adder 113; an error detector 111 for detecting an error between the output of the adder 113 and the output of the decider 112; a movement direction estimator 110 for estimating the movement direction of the transmitting side; and a radiation pattern rotator 114 for rotating the radiation pattern based on the output of the movement direction estimator 110. Operations of these elements will be described hereinafter.

The reception antennas 101, 102, 103 and 104 receive propagated radio waves. The number of antennas is not limited to four but may be a number other than four. The inputs from the respective antennas and the output (weight) of the reception radiation pattern controller 109 are multiplied by the multipliers 105, 106, 107 and 108 respectively, and are composed by the adder 113.

Here, the input signals from the antennas at a time t are expressed in vector form as $S(t) = \{S_1(t), S_2(t), S_3(t), S_4(t)\}^T$ and the outputs (weights) of the reception radiation pattern controller which are to be multiplied by the signals from the respective antennas are $W(t) = \{(W_1(t), W_2(t), W_3(t), W_4(t)\}^T$. Then, the output S(t) of the adder 113 can be expressed as the following formula (3):

$$S(t) = \Sigma_1^4 W^*_i(t)^T s_i(t) \quad (3)$$

The decider 112 performs hard decision of the output of the adder 113. When the decision result is D(t), the error detector 111 outputs the difference between D(t) and S(t) and supplies the difference to the reception radiation pattern controller 109. Based on the difference, the reception radiation pattern controller 109 updates the values of the weights to be multiplied by the input signals from the antennas. The reception radiation pattern in the first embodiment of the present invention is not finally decided by the updated algorithm. However, for example, the reception radiation pattern controller 109 updates the outputs according to the following formula (4):

$$W(t+1) = W(t) + \mu(D(t) - \text{Sig}(t))^T \text{Sig}(t) \quad (4)$$

The movement direction estimator 110 estimates the movement direction of the transmitting side. The movement direction estimation may be performed by any method. Examples of the method include a method in which a GPS receiver is used on the transmitting side and position information is transmitted, a method in which a GPS is used on the receiving side and a relative movement direction is detected, and a method which uses reception radiation pattern generated from a reception wave as described later.

The radiation pattern rotator 114 rotates the reception radiation pattern in accordance with the estimated movement direction of the transmitting side. As shown in FIG. 5, when the direction of the transmitting side viewed from the receiving side is θ 301 and a position normalized by the wavelength is $(x_i, y_i)$ with respect to the reference point of each antenna element, the phase shift from a reference point 306 at an antenna position 305 situated at $(x_i, y_i)$ on an x-y plane can be expressed as the following formula (5):

$$\sqrt{x_i^2 + y_i^2} \cos(\phi + \theta) \quad (5)$$

Here, φ is an angle 302 between the antenna position 305 and the reference point 306. The angle 302 may be $x_i \cos\theta - y_i \sin\theta$.

Expressing in radians the phase shift expressed by the formula (5), $2\pi(x_i \cos\theta - y_i \sin\theta)$ 304. This is the phase variation from the reference point 306 at the antenna position 305. The incident angle θ may be obtained by any method. Examples of the method include a method in which the incident angle θ is obtained by using position information measured in a reception signal by use of a GPS receiver on the transmitting side, a method which uses a direction where the maximum gain of the radiation pattern formed by the reception radiation pattern controller is obtained, and a method which uses a direction where the desired signal power-to-interference signal power ratio is high irrespective of reception power. These methods are advantageous in cost reduction because a relative angle from a communication partner can be calculated by estimating from the reception signals the direction in which reception waves are transmitted.

When the transmitting side moves, by obtaining a distance change amount $\Delta l_i$ between when the angle viewed from the receiver is θ+α and the angle viewed from the receiver is θ, and converting the distance variation into a value expressed in radians, a phase variation $\Delta\theta_i$ which affects the respective antennas can be obtained. By composing the inputs of the respective antennas after multiplying each of the inputs by a value which cancels the phase varietion $\Delta\theta_i$, the direction of the radiation pattern of the antennas can be rotated. Specifically, since the distance difference from the reference point when the angle is θ+α can be expressed, for example, as the following formula (6), the distance variation $\Delta l_i$ due to a movement of the transmitting side can be expressed as the following formula (7):

$$\sqrt{x_i^2 + y_i^2} \cos(\phi + \theta + \alpha) \quad (6)$$

$$\sqrt{x_i^2 + y_i^2} \cos(\phi + \theta) - \sqrt{x_i^2 + y_i^2} \cos(\phi + \theta + \alpha) \quad (7)$$

Rewriting this formula, the following formula (8) is obtained:

$$\Delta l_i = -2\sqrt{x_i^2 + y_i^2} \{\cos(\phi - \alpha/2)\sin\theta + \sin(\phi + \alpha/2)\cos\theta\}\sin\alpha/2 \quad (8)$$

Obtaining the phase variation $\Delta\theta_i$ converting the distance variation into a value expressed in radians, the phase variation $\Delta\theta_i$ can be expressed as the following formula (9):

$$\Delta\theta_i = -4\pi\sqrt{x_i^2 + y_i^2} \{\cos(\phi - \alpha/2)\sin\theta + \sin(\phi + \alpha/2)\cos\theta\}\sin\alpha/2 \quad (9)$$

Thus, since the phases of the antennas are shifted by $\Delta\theta_i$ by a movement of a mobile station by an angle α, by multiplying the weight of each antenna by a conjugate complex number which cancels the variation, the signals from the respective antennas can be composed so that the phases of the signals coincide with one another at the reference point, that is, the radiation pattern is formed in the direction in which the mobile station moves by the angle α. As a result, the reception performance can be improved. The conjugate complex number to be multiplied is, for example, as shown in the following formula (10):

$$\Delta W_i = \cos(\Delta\theta_i) - j\sin(\Delta\theta_i) \quad (10)$$

The same results are obtained when a predetermined value is added to or multiplied by the distance variation $\Delta l_i$, the phase variation $\Delta\theta_i$ and the conjugate complex number $\Delta W_i$ irrespective of i.

As described above, according to the first embodiment of the present invention, since the reception radiation pattern can be rotated in accordance with the movement of the transmitting side, even when the movement speed of the transmitting side or the receiving side is high, the reception radiation pattern controller or a transmission radiation pattern controller can conform to the movement. Consequently, a correct radiation pattern can be formed, so that the transmission and reception performance can be improved.

Second Embodiment

Figure 6:
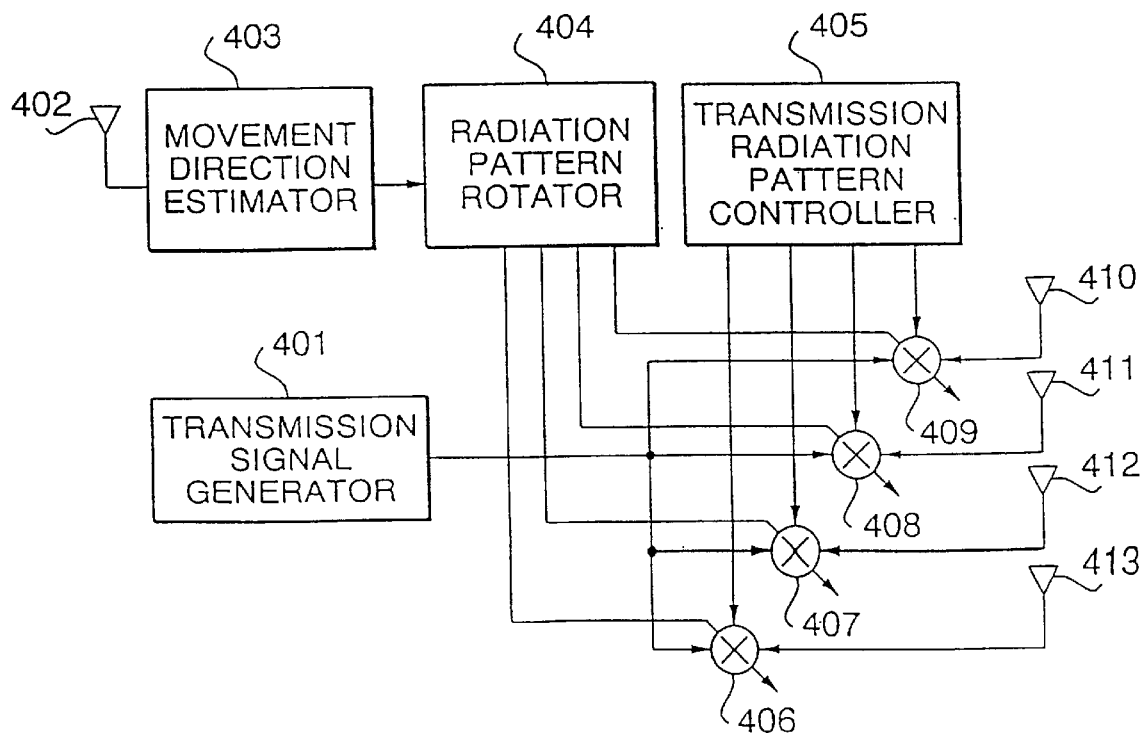
FIG. 6 is a block diagram of an adaptive transmission diversity apparatus according to a second embodiment of the present invention.

FIG. 6 is a block diagram of an adaptive transmission diversity apparatus according to a second embodiment in which the present invention is applied to a transmitter.

The second embodiment shown in FIG. 6 includes a transmission signal generator 401 for generating a transmission signal; a reception antenna 402; a movement direction estimator 403 for estimating a movement direction; a transmission radiation pattern controller 405 for forming a transmission radiation pattern; a radiation pattern rotator 404 for rotating the radiation pattern based on the output of the movement direction estimator; multipliers 406, 407, 408 and 409 for multiplying the output of the transmission radiation pattern controller and the transmission signal; and a plurality of transmission antennas 410, 411, 412 and 413. A plurality of reception antennas may be provided.

The radiation pattern of the antennas is changed in the following manner: When the receiving side moves, by obtaining a distance variation $\Delta l_i$ between when the angle viewed from the transmitter is $\theta+\alpha$ and the angle viewed from the transmitter is $\theta$, and converting the distance variation into a value expressed in radians, a phase variation $\Delta \theta_i$ which affects the respective antennas is obtained. By composing the inputs of the respective antennas after multiplying each of the inputs by a value which cancels the phase variation $\Delta \theta_i$, the direction of the radiation pattern of the antennas is rotated.

The transmission signal generated by the transmission signal generator 401 is multiplied by a transmission radiation pattern signal which is the output of the transmission radiation pattern controller 405, and then, transmitted from the transmission antennas 410, 411, 412 and 413. In that case, when the receiving side is moving, the radiation pattern rotator 404 rotates the radiation pattern in consideration of the movement direction of the receiving side which is estimated by the movement direction estimator 403. Thereby, a sudden movement of the receiving side can be handled.

As is apparent from the description given above, according to the present invention, the radiation pattern at the time of reception can highly accurately conform to a movement of a transmitting side even when the movement speed is high. In addition, the radiation pattern at the time of transmission can respond to a movement of a receiving side even when the movement speed is high.

Further, by applying the present invention to each of a reception portion and a transmission portion, when a user uses, while moving, a portable communication apparatus time-divisional and alternately having a transmission slot and a reception slot, the transmission and reception accuracy improves.

What is claimed is:

1. An adaptive reception diversity apparatus, comprising:
 a reception radiation pattern controller that provides a reception signal from an antenna with a first reception radiation pattern by a first control signal;
 a movement direction estimator that estimates a movement direction of a transmitting apparatus in accordance with the reception signal from said antenna;
 a radiation pattern controller that provides said reception signal with a second reception radiation pattern by a second control signal based on an output of said movement direction estimator; and
 a reception signal processing system having a multiplier that multiplies said reception signal by said first control signal and said second control signal.

2. An adaptive reception diversity apparatus according to claim 1, wherein said radiation pattern control means outputs said second control signal for controlling rotation of said first reception radiation pattern based on the output of said movement direction estimating means.

3. An adaptive reception diversity apparatus according to claim 1, wherein said radiation pattern control means generates said second control signal so as to cancel a phase variation obtained by displacement of a direction of arrival of a reception wave.

4. The apparatus of claim 1, wherein said movement direction estimator estimates movement of the transmitting apparatus based on position information of said transmitting apparatus that is included in said reception signal.

5. The apparatus of claim 4, wherein said transmission apparatus transmits said position information based on a position of said transmission apparatus.

6. An adaptive reception diversity apparatus according to claim 1, wherein said reception radiation pattern control means and said radiation pattern means are provided independently of each other, and said reception signal, said first control signal and said second control signal are multiplied by single multiplication means.

7. An adaptive reception diversity apparatus, comprising:
 a plurality of antennas;
 movement direction estimating means for estimating a movement direction of a transmitting side;
 reception radiation pattern control means for providing reception signals from the antennas with reception radiation pattern;
 addition means for composing a plurality of inputs from said antennas;
 radiation pattern control means for controlling rotation of said reception radiation pattern based on an output of said movement direction estimating means;
 decision means for performing hard decision of an output of said addition means; and
 error detecting means for detecting an error between an output of said decision means and the output of said addition means, and feeding back the error to said reception radiation pattern control means.

8. An adaptive reception diversity apparatus according to claim 7, wherein said radiation pattern control means obtains a relative phase variation due to a movement of the transmitting side at each of said plurality of disposed antennas based on the output of the movement direction estimating means, and generates a second control signal in accordance with each phase variation.

9. An adaptive transmission diversity apparatus, comprising:
 a transmission radiation pattern controller that provides a transmission signal for an antenna with a first transmission radiation pattern by a first control signal;
 a movement direction estimator that estimates a movement direction of a receiving apparatus in accordance with the reception signal from said antenna;
 a radiation pattern correction controller that provides said transmission signal with a second transmission radiation pattern by a second control signal based on an output of said movement direction estimator; and
 a transmission signal processing system having a multiplier that multiplies said transmission signal by said first control signal and said second control signal.

10. An adaptive transmission diversity apparatus according to claim 9, wherein said radiation pattern control means outputs said second control signal for controlling rotation of said first transmission radiation pattern based on the output of said movement direction estimating means.

11. An adaptive transmission diversity apparatus according to claim 9, wherein said radiation pattern control means generates said second control signal so as to cancel a phase variation obtained by displacement of a direction of arrival of a reception wave.

12. An adaptive transmission diversity apparatus according to claim 9, wherein said transmission radiation pattern control means and said radiation pattern control means are provided independently of each other, and said transmission signal, said first control signal and said second control signal are multiplied by single multiplication means.

13. An adaptive transmission diversity apparatus according to claim 9, wherein said radiation pattern control means obtains a relative phase variation due to a movement of the receiving side at each of a plurality of disposed antennas based on the output of the movement direction estimating means, and generates a second control signal in accordance with each phase variation.

14. The apparatus of claim 9, wherein said movement direction estimator estimates movement of the receiving apparatus based on position information of said receiving apparatus that is included in said reception signal.

* * * * *